UNITED STATES PATENT OFFICE.

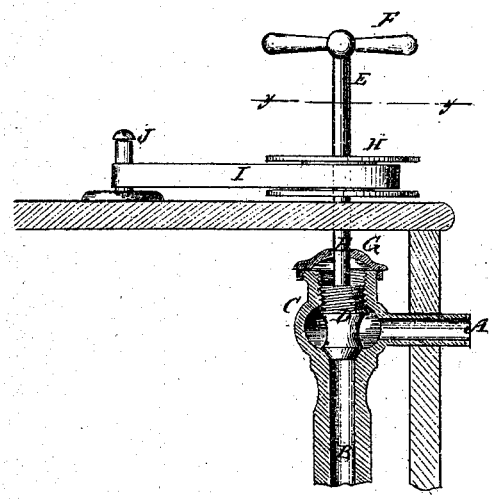
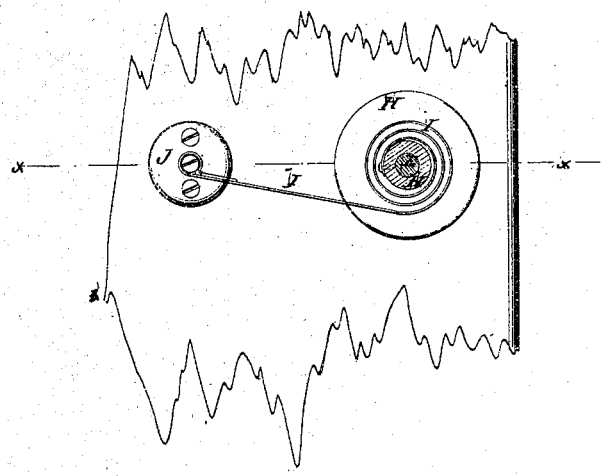

JOSIAH W. CARNEY, OF CHARLESTOWN, MASSACHUSETTS.

IMPROVEMENT IN VALVES FOR STOP-COCKS.

Specification forming part of Letters Patent No. 106,121, dated August 9, 1870.

*To all whom it may concern:*

Be it known that I, JOSIAH W. CARNEY, of Charlestown, in the county of Middlesex and State of Massachusetts, have invented a new and useful Improvement in Valves; and I do hereby declare that the following is a full, clear, and exact description thereof, which will enable others skilled in the art to make and use the same, reference being had to the accompanying drawing, forming part of this specification, in which—

Figure 1 is a detail sectional view of a valve to which my improvement has been attached, taken through the line $x\ x$, Fig. 2. Fig. 2 is a top view of the same, partly in section, through the line $y\ y$, Fig. 1.

Similar letters of reference indicate corresponding parts.

My invention has for its object to furnish an improved spring attachment for the valve-stems of step-valves, stop-cocks, faucets, &c., which shall be simple in construction, will make the valve self-closing, and which may be attached to valves already in use without disturbing the plumbing; and it consists in the construction and combination of the spring and its attachments with the stem of the valve, as hereinafter more fully described.

A and B are the inlet and outlet pipes. C is the globe or hopper. D is the valve. E is the valve-stem, and F is the handle of the valve, about the construction of which parts there is nothing new.

Upon the upper part of the valve D is cut a screw-thread, which screws into a screw-thread in the upper part of the globe C, where it is secured in place by a cap-nut, G, through a hole in the center of which the valve-stem E passes.

H is a flanged drum placed upon and secured to the stem E, and to which is secured one end of the flat spring I. The spring I is wound around the drum H, and its other end has an eye or socket formed upon or attached to it, through which passes a stud or post, J, attached to some suitable support, and which is made of such a length that the end of the spring I may move up and down upon it as the stem E rises and descends in opening and closing the valve.

By this construction, when the valve-stem is screwed up to open the valve the spring I will be coiled around the drum H, and when the said valve-stem is released the elasticity of the spring I will at once turn the stem E back and force the valve D down to its seat, closely closing it.

Having thus described my invention, I claim as new and desire to secure by Letters Patent—

The arrangement of the stud J, spring I, and flanged drum H, with respect to a valve-shaft, E, as and for the purpose described.

JOSIAH W. CARNEY.

Witnesses:
 WILLIAM HUNNEWELL,
 S. W. CHASE.